United States Patent
Tsai (10) Patent No.: US 11,258,360 B2
(45) Date of Patent: Feb. 22, 2022

(54) SWITCHED-CAPACITOR POWER CONVERTING APPARATUS AND OPERATING METHOD THEREOF

(71) Applicant: uPI semiconductor corp., Zhubei (TW)

(72) Inventor: Yu-Chu Tsai, Zhubei (TW)

(73) Assignee: UPI SEMICONDUCTOR CORP., Zhubei (TW)

( * ) Notice: Subject to any disclaimer, the term of this patent is extended or adjusted under 35 U.S.C. 154(b) by 80 days.

(21) Appl. No.: 16/835,374

(22) Filed: Mar. 31, 2020

(65) Prior Publication Data
US 2020/0366194 A1    Nov. 19, 2020

(30) Foreign Application Priority Data
May 17, 2019   (CN) .......................... 201910410605.0

(51) Int. Cl.
*H02M 3/07*    (2006.01)
(52) U.S. Cl.
CPC ..................... *H02M 3/07* (2013.01)
(58) Field of Classification Search
CPC ...... H02M 3/07; H02M 3/158; H02M 1/0045; H02M 1/0025; H02M 1/32
See application file for complete search history.

(56) References Cited

U.S. PATENT DOCUMENTS

| 9,484,799 | B2 * | 11/2016 | Zhang ................... H02M 3/155 |
| 9,998,000 | B2 | 6/2018 | Zhang et al. |
| 10,027,223 | B1 | 7/2018 | Zhang et al. |
| 2006/0139074 | A1 | 6/2006 | Doi |

* cited by examiner

*Primary Examiner* — Sibin Chen
(74) *Attorney, Agent, or Firm* — McClure, Qualey & Rodack, LLP (57) ABSTRACT

A switched-capacitor power converting apparatus and an operating method thereof are disclosed. The switched-capacitor power converting apparatus includes an output stage, a determination circuit, a switch control circuit and a voltage regulation circuit. The output stage has an output terminal. The determination circuit is coupled to the output terminal, and generates a mode switching signal according to an output voltage of the output terminal and a reference voltage. The switch control circuit is coupled to the output stage and the determination circuit and controls the output stage to operate in a default voltage mode or an operation mode according to the mode switching signal. The voltage regulation circuit is coupled to the output terminal and the determination circuit and maintains the output voltage of the output terminal at a default value in the default voltage mode.

9 Claims, 7 Drawing Sheets

SWITCHED-CAPACITOR POWER CONVERTING APPARATUS AND OPERATING METHOD THEREOF

BACKGROUND OF THE INVENTION

1. Field of the Invention

The invention relates to power conversion; in particular, to a switched-capacitor power converting apparatus and an operating method thereof.

2. Description of the Prior Art

Figure 1:
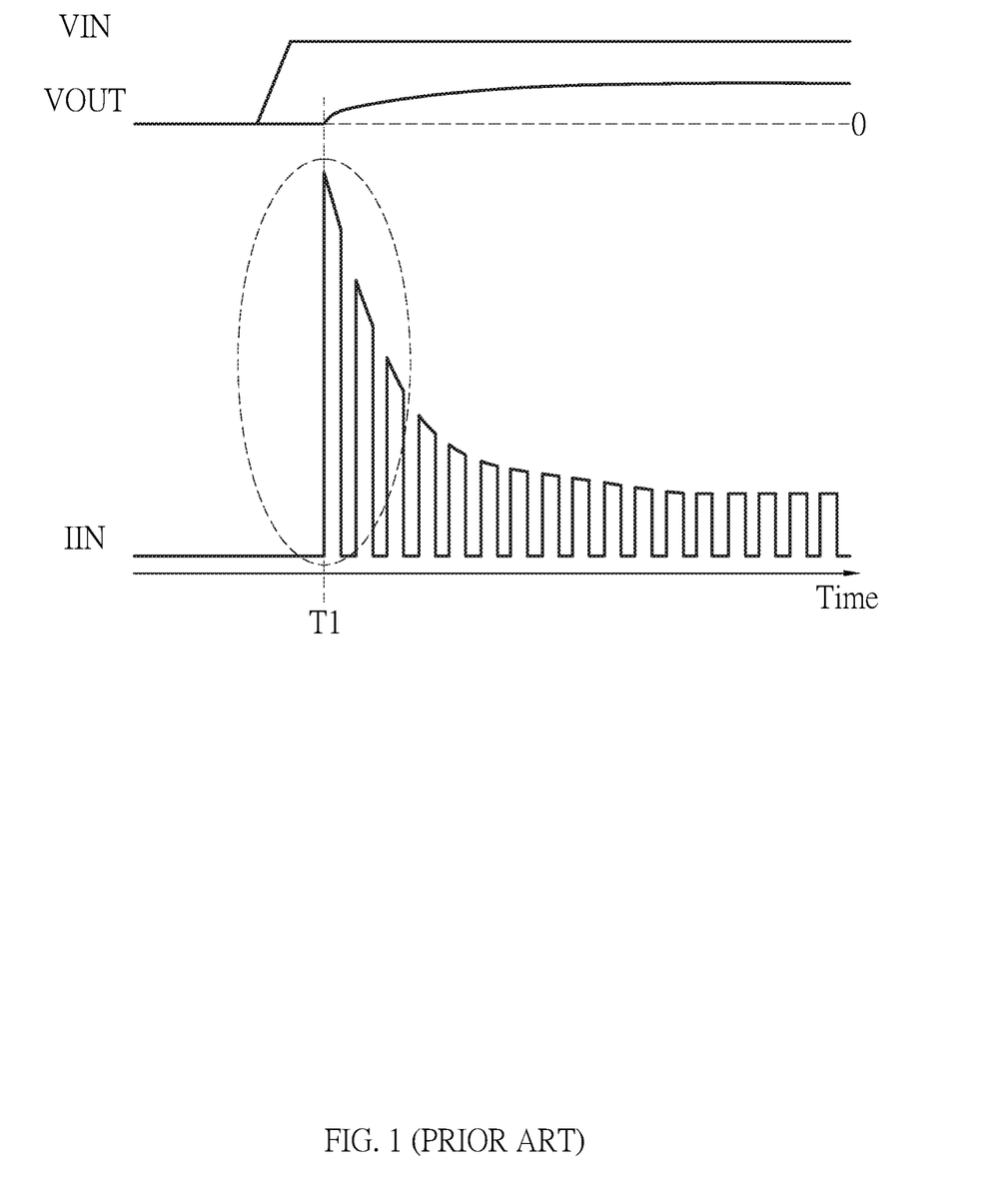

As shown in FIG. 1, when the conventional switched-capacitor power converting apparatus starts to switch, at the time T1, the output voltage VOUT is 0. If the voltage is completely generated by the switched capacitor, when the first switch closest to the input voltage VIN in the output stage is turned on, the voltage across the first switch is the input voltage VIN, which causes the input current IIN flowing through the first switch at the time T1 to be quite large to generate an "inrush current" phenomenon. It seriously affects the stability of the conventional switched-capacitor power converting apparatus when performing power conversion, and it needs to be overcome urgently.

SUMMARY OF THE INVENTION

Therefore, the invention provides a switched-capacitor power converting apparatus and an operating method thereof to solve the above-mentioned problems occurred in the prior arts.

An embodiment of the invention is a switched-capacitor power converting apparatus. In this embodiment, the switched-capacitor power converting apparatus includes an output stage, a determination circuit, a switch control circuit and a voltage regulation circuit. The output stage has an output terminal. The determination circuit is coupled to the output terminal and configured to generate a mode switching signal according to an output voltage of the output terminal and a reference voltage. The switch control circuit is coupled to the output stage and the determination circuit and configured to control the output stage to operate in a default voltage mode or an operation mode according to the mode switching signal. The voltage regulation circuit is coupled to the output terminal and the determination circuit and configured to maintain the output voltage of the output terminal at a default value in the default voltage mode.

In an embodiment, the reference voltage is a first voltage value in the default voltage mode and the reference voltage is a second voltage value in the operation mode; the first voltage value is greater than the second voltage value.

In an embodiment, in the operation mode, when the output voltage of the output terminal is lower than the second voltage value, the output stage is switched from the operation mode to the default voltage mode.

In an embodiment, the determination circuit includes a first transistor, a second transistor and a comparator. One terminal of the first transistor is coupled to the first voltage value and a gate of the first transistor is controlled by the mode switching signal. One terminal of the second transistor is coupled to the second voltage value and a gate of the second transistor is controlled by a switch control signal, wherein the switch control signal and the mode switching signal are opposite to each other. One input terminal of the comparator is coupled to the output terminal and the other input terminal of the comparator is coupled to the other terminal of the first transistor and the other terminal of the second transistor, the comparator is configured to receive the output voltage and the reference voltage respectively and generate the mode switching signal accordingly.

In an embodiment, the switch control circuit includes an inverter and a control circuit. The inverter is coupled to the determination circuit and configured to generate a switch control signal according to the mode switching signal, wherein the switch control signal and the mode switching signal are opposite to each other. The control circuit is coupled to the inverter and the output stage and configured to control an operation of the output stage according to the switch control signal.

In an embodiment, the voltage regulation circuit includes a first resistor, a second resistor, a third resistor, a fourth resistor, a transistor and an error amplifier. The first resistor and a second resistor are coupled in series between an input voltage and a ground terminal. The transistor, the third resistor and the fourth resistor are coupled in series between the input voltage and the ground terminal. One input terminal of the error amplifier is coupled between the first resistor and the second resistor to receive a voltage signal and the other input terminal of the error amplifier is coupled between the third resistor and the fourth resistor to receive a feedback signal. The error amplifier is configured to generate a control signal according to the mode switching signal, the voltage signal and the feedback signal.

Another embodiment of the invention is a method of operating a switched-capacitor power converting apparatus. In this embodiment, the switched-capacitor power converting apparatus includes an output stage having an output terminal. The method includes steps of: (a) generating a mode switching signal according to an output voltage of the output terminal and a reference voltage; (b) controlling the output stage to operate in a default voltage mode or an operation mode according to the mode switching signal; and (c) in the default voltage mode, maintaining the output voltage of the output terminal at a default value.

Compared to the prior arts, the switched-capacitor power converting apparatus and an operating method thereof in the invention selectively switch the output stage to operate in a default voltage mode or an operation mode according to an output voltage and a reference voltage. In the default voltage mode, the output voltage is maintained at a default value; in the operation mode, when the output voltage is lower than the default voltage, the operation mode is switched back to the default voltage mode.

Therefore, when the switched-capacitor power converting apparatus of the invention performs switching, since the voltage difference between the output voltage and the input voltage has been greatly reduced, that is to say, the voltage across both sides of the first switch closest to the input voltage in the output stage has been greatly reduced, so that the inrush current flowing through the first switch when the first switch is turned on can be effectively suppressed to improve the stability of the switched-capacitor power converting apparatus for power conversion.

The advantage and spirit of the invention may be understood by the following detailed descriptions together with the appended drawings.

BRIEF DESCRIPTION OF THE APPENDED DRAWINGS

FIG. 1 illustrates a schematic diagram showing that when the conventional switched-capacitor power converting apparatus starts to switch, the first switch closest to the input voltage in the output stage generates a quite large inrush current when it is turned on.

DETAILED DESCRIPTION OF THE INVENTION

Reference will now be made in detail to the exemplary embodiments, the same or similar reference numbers or components used in the drawings and the embodiments are used to represent the same or similar parts.

An embodiment of the invention is a switched-capacitor power converting apparatus. In this embodiment, the switched-capacitor power converting apparatus converts an input voltage into an output voltage by charging and discharging a switched capacitor.

Figure 2:
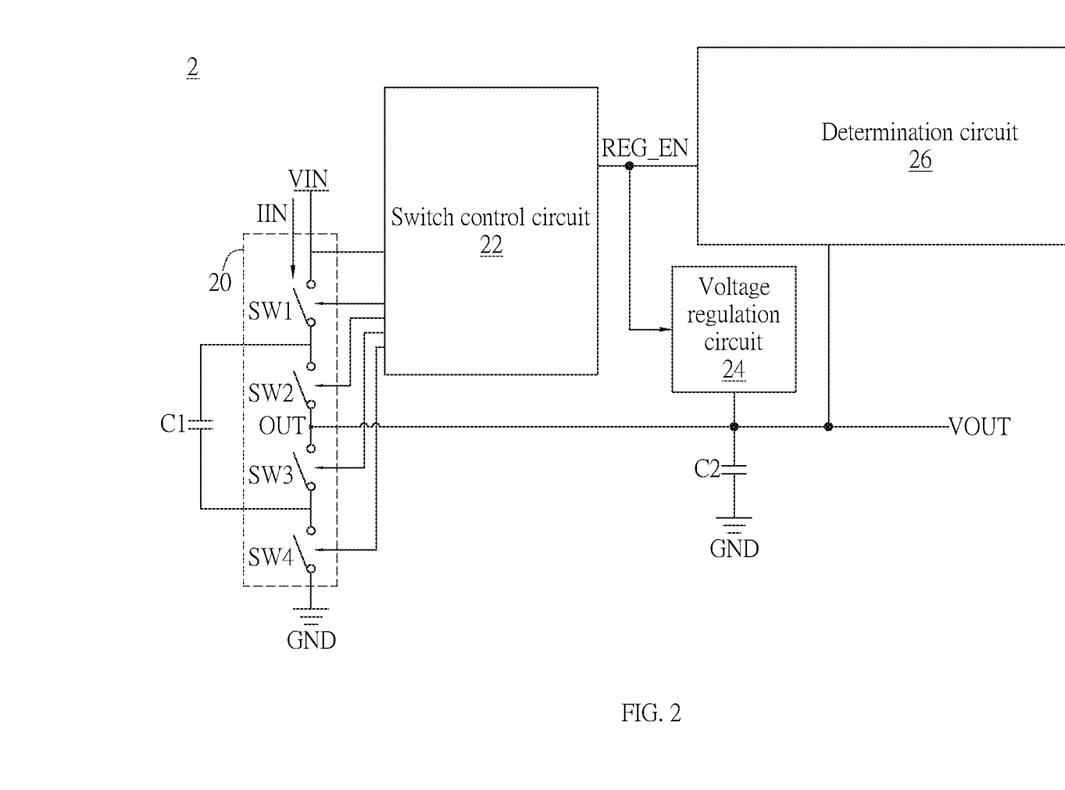
FIG. 2, FIG. 3 and FIG. 4 illustrate different embodiments of the switched-capacitor power converting apparatus in the invention respectively.

Please refer to FIG. 2. FIG. 2 illustrates a schematic diagram of a switched-capacitor power converting apparatus in this embodiment.

As shown in FIG. 2, the s switched-capacitor power converting apparatus 2 includes an output stage 20, a switch control circuit 22, a voltage regulation circuit 24, a determination circuit 26 and capacitors C1~C2. The output stage 20 is coupled between an input voltage VIN and a ground terminal GND. The switch control circuit 22 is coupled to the output stage 20 and the determination circuit 26 respectively. The voltage regulation circuit 24 is coupled to the output stage 20 and the determination circuit 26 respectively. The capacitor C1 is coupled to the output stage 20. The capacitor C2 is coupled between the voltage regulation circuit 24 and the ground terminal GND.

The output stage 20 includes a first switch SW1, a second switch SW2, a third switch SW3 and a fourth switch SW4. The first switch SW1, the second switch SW2, the third switch SW3 and the fourth switch SW4 are coupled in series between the input voltage VIN and the ground terminal GND. One terminal of the capacitor C1 is coupled between the first switch SW1 and the second switch SW2 and the other terminal of the capacitor C1 is coupled between the third switch SW3 and the fourth switch SW4.

The first switch SW1, the second switch SW2, the third switch SW3 and the fourth switch SW4 are all coupled to the switch control circuit 22. The operations of the first switch SW1, the second switch SW2, the third switch SW3 and the fourth switch SW4 are all controlled by the switch control circuit 22. The output stage 20 has an output terminal OUT, and the output terminal OUT is located between the second switch SW2 and the third switch SW3.

The determination circuit 26 is coupled to the output terminal OUT and generates a mode switching signal REG_EN according to an output voltage VOUT of the output terminal OUT. The switch control circuit 22 receives the mode switching signal REG_EN and controls the output stage 20 to operate in a default voltage mode or an operation mode according to the mode switching signal REG_EN.

In the default voltage mode, the voltage regulation circuit 24 maintains the output voltage VOUT of the output terminal OUT at a default value according to the mode switching signal REG_EN. In practical applications, the default value can be one-half of the input voltage VIN, but not limited to this.

Figure 3:
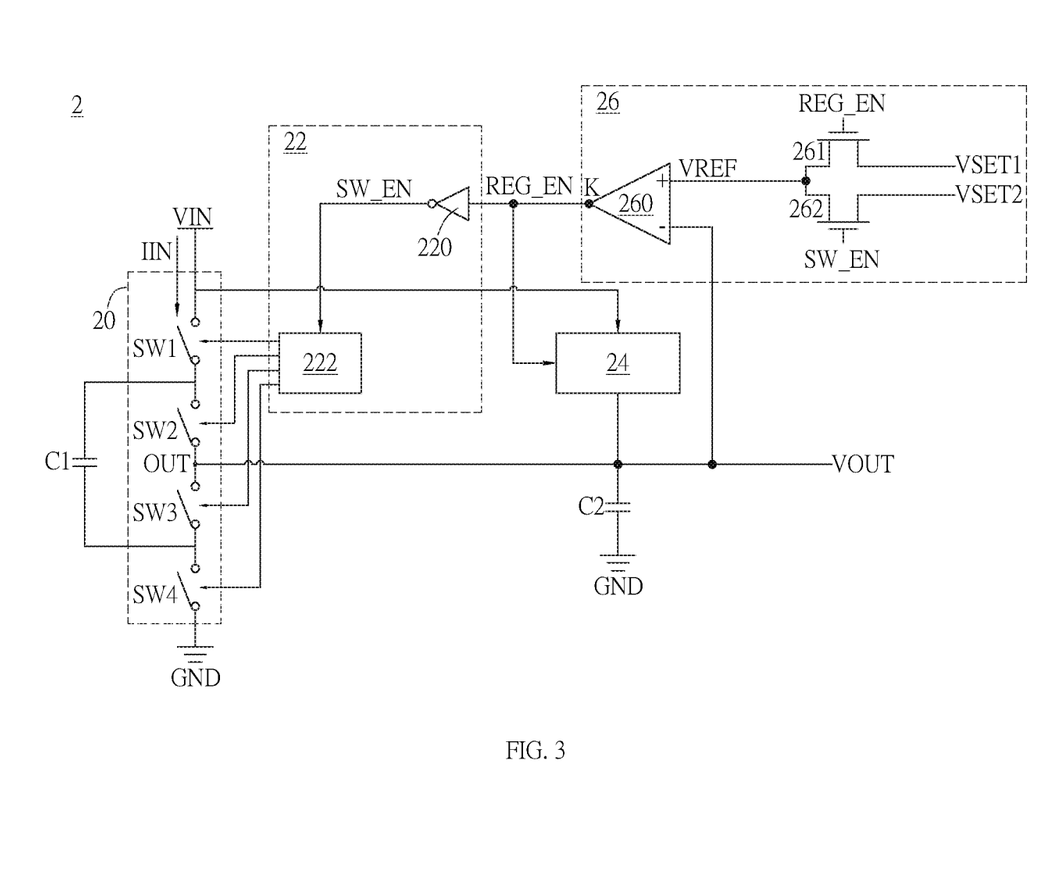

In an embodiment, as shown in FIG. 3, the determination circuit 26 can include a comparator 260, a first transistor 261 and a second transistor 262. One terminal of the first transistor 261 is coupled to a first voltage value VSET1 and the other terminal of the first transistor 261 is coupled to an input terminal+ of the comparator 260. One terminal of the second transistor 262 is coupled to a second voltage value VSET2 and the other terminal of the first transistor 261 is coupled to the input terminal+ of the comparator 260. In this embodiment, the first voltage value VSET1 is greater than the second voltage value VSET2.

A gate of the first transistor 261 is controlled by the mode switching signal REG_EN and a gate of the second transistor 262 is controlled by the switch control signal SW_EN. The switch control signal SW_EN and the mode switching signal REG_EN are opposite to each other. The input terminal+ of the comparator 260 is coupled to the other terminal of the first transistor 261 and the other terminal of the second transistor 262. The input terminal− of the comparator 260 is coupled to the output terminal OUT. The output terminal K of the comparator 260 is coupled to the switch control circuit 22.

The input terminal+ of the comparator 260 receives a reference voltage VREF and the input terminal− of the comparator 260 receives the output voltage VOUT of the output terminal OUT. The comparator 260 generates a mode switching signal REG_EN according to the output voltage VOUT and the reference voltage VREF.

It should be noted that the reference voltage VREF received by the input terminal+ of the comparator 260 can be different voltage values in different operation modes. In this embodiment, the reference voltage VREF received by the input terminal+ of the comparator 260 is a first voltage value VSET1 in the default voltage mode and is a second voltage value VSET2 in the operation mode, but not limited to this.

The control circuit 22 can include an inverter 220 and a control circuit 222. The inverter 220 is coupled to the determination circuit 26. The inverter 220 receives the mode switching signal REG_EN and generates a switch control signal SW_EN opposite to the mode switching signal REG_EN to the control circuit 222 according to the mode switching signal REG_EN. The control circuit 222 is coupled to the inverter 220 and the first switch SW1 to the fourth switch SW4 in the output stage 20 respectively. The control circuit 222 controls the operations of the first switch SW1 to the fourth switch SW4 in the output stage 20 according to the switch control signal SW_EN.

In the operation mode, the reference voltage VREF is the second voltage value VSET2. When the output voltage VOUT of the output terminal OUT is lower than the second voltage value VSET2, the control circuit 22 will control the output stage 20 to switch from the operation mode back to the default voltage mode, and the output voltage VOUT of the output terminal OUT will be maintained at a default value (for example, one-half of the input voltage VIN, but not limited to this) by the voltage regulation circuit 24.

Figure 4:
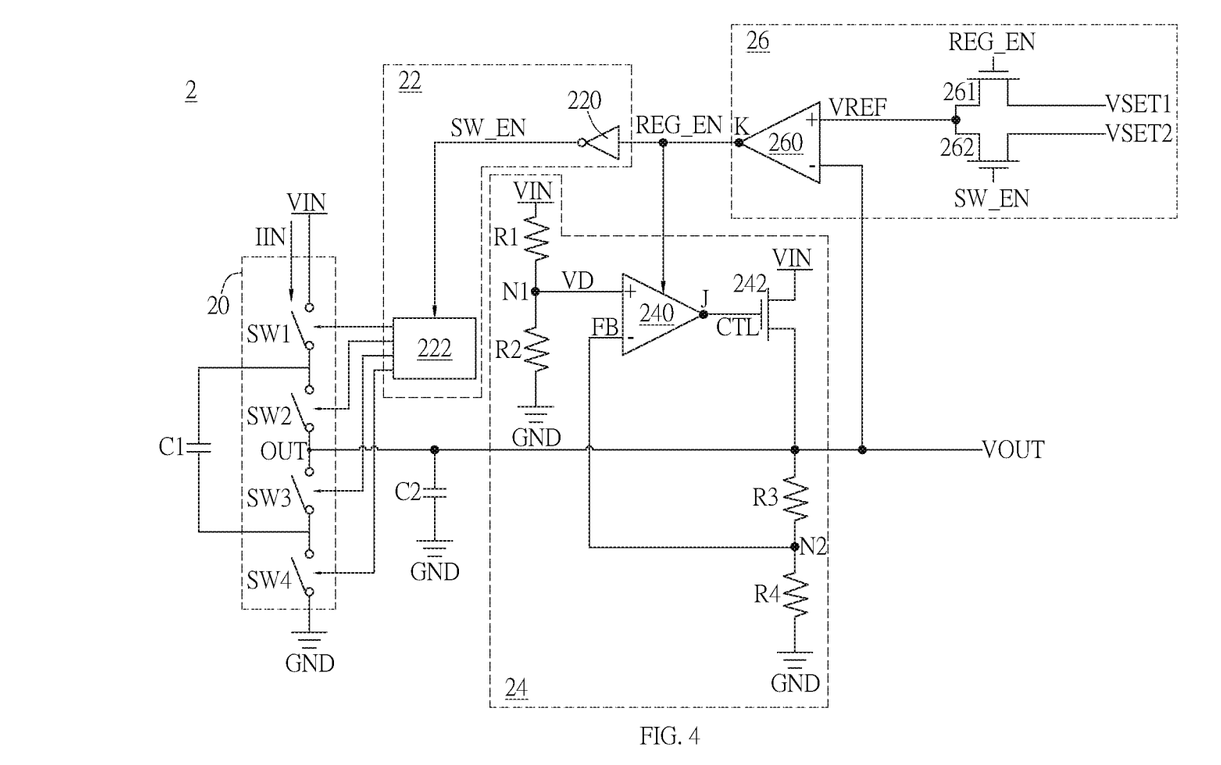

In an embodiment, as shown in FIG. 4, the voltage regulation circuit 24 can include an error amplifier 240, a transistor 242, a first resistor R1, a second resistor R2, a third resistor R3 and a fourth resistor R4. The first resistor R1 and the second resistor R2 are coupled in series between the input voltage VIN and the ground terminal GND. The transistor 242 is coupled between the input voltage VIN and the output voltage VOUT. The third resistor R3 and the fourth resistor R4 are coupled in series between the output voltage VOUT and the ground terminal GND. The input terminal+ of the error amplifier 240 is coupled to a node N1 between the first resistor R1 and the second resistor R2 to receive a voltage signal VD from the node N1. The input terminal− of the error amplifier 240 is coupled to a node N2 between the third resistor R3 and the fourth resistor R4 to receive a feedback signal FB from the node N2.

It should be noted that the first resistor R1 and the second resistor R2 are coupled in series between the input voltage VIN and the ground terminal GND and the input terminal+ of the error amplifier 240 receives the voltage signal VD from the node N1 between the first resistor R1 and the second resistor R2; therefore, the voltage signal VD is related to the input voltage VIN, and the voltage signal VD is substantially a divided voltage of the input voltage VIN.

Similarly, the third resistor R3 and the fourth resistor R4 are coupled in series between the output voltage VOUT and the ground terminal GND and the input terminal− of the error amplifier 240 receives the feedback signal FB from the node N2 between the third resistor R3 and the fourth resistor R4; therefore, the feedback signal FB is related to the output voltage VOUT, and the feedback signal FB is substantially a divided voltage of the output voltage VOUT.

In practical applications, the voltage regulation circuit 24 can be a low dropout regulator (LDO), a voltage follower or any other device with a voltage-locking function.

When the error amplifier 240 receives the mode switching signal REG_EN outputted by the determination circuit 26, the error amplifier 240 will generate a control signal CTL to the gate of the transistor 242 according to the voltage signal VD and the feedback signal FB received by the input terminal+ and the input terminal− of the error amplifier 240 respectively. The operation of the transistor 242 can be controlled by the control signal CTL to maintain the output voltage VOUT of the output terminal OUT at a default value (for example, one-half of the input voltage VIN, but not limited to this) in the default voltage mode.

In an embodiment, when the output voltage VOUT is very low, the mode switching signal REG_EN generated by the determination circuit 26 according to the output voltage VOUT and the reference voltage VREF has a first voltage level (e.g., a high-level), and the switch control circuit 22 controls the output stage 20 to operate in the default voltage mode according to the mode switching signal REG_EN having the first voltage level (e.g., the high-level), and the voltage regulation circuit 24 maintains the output voltage VOUT at the default value (for example, the first voltage value VSET1) according to the mode switching signal REG_EN having the first voltage level (e.g., the high-level).

When the output voltage VOUT is higher than the first voltage value VSET1, the determination circuit 26 will generate the mode switching signal REG_EN having a second voltage level (e.g., a low-level), and the control circuit 22 will generate the switch control signal SW_EN opposite to the mode switching signal REG_EN; that is to say, the switch control signal SW_EN will have the first voltage level (e.g., the high-level). The switch control circuit 22 controls the output stage 20 to operate in the operation mode according to the switch control signal SW_EN having the first voltage level (e.g., the high-level). At this time, the reference voltage VREF can be dynamically adjusted from the first voltage value VSET1 to the second voltage value VSET2.

In the operation mode, when the output voltage VOUT is lower than the second voltage value VSET2 due to excessive load, the mode switching signal REG_EN generated by the determination circuit 26 will become the first voltage level (e.g., the high-level), and the control circuit 22 will generate the switch control signal SW_EN opposite to the mode switching signal REG_EN; that is to say, the switch control signal SW_EN will have the second voltage level (e.g., the low-level). At this time, the switch control circuit 22 will control the output stage 20 to operate in the default voltage mode according to the mode switching signal REG_EN having the first voltage level (e.g., the high-level), and the voltage regulation circuit 24 will maintain the output voltage VOUT at the default value (e.g., the first voltage value VSET1) according to the mode switching signal REG_EN having the first voltage level (e.g., the high-level).

Figure 5:
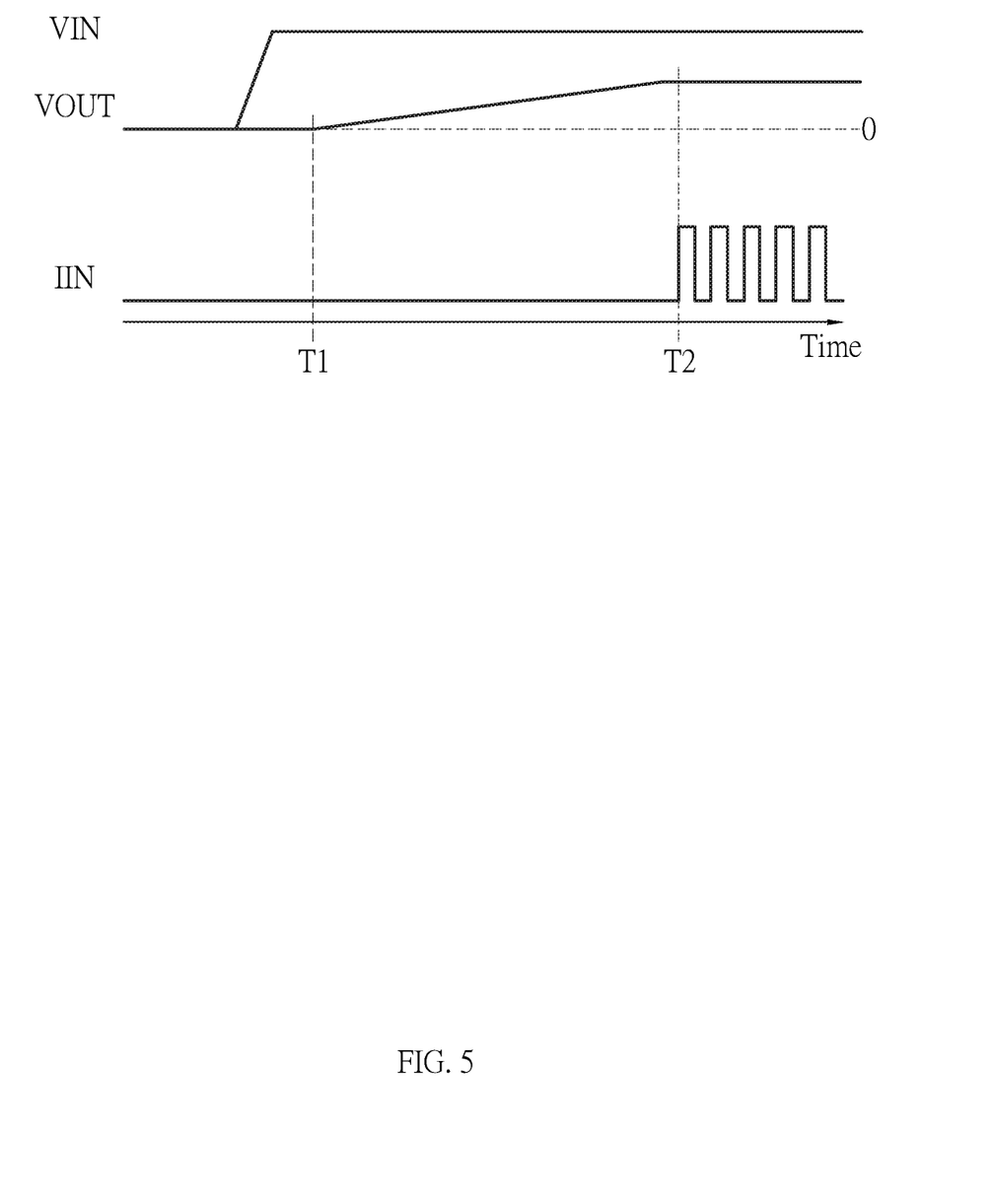
FIG. 5 illustrates a schematic diagram showing that when the switched-capacitor power converting apparatus of the invention starts to switch, the voltage difference between the input voltage and the output voltage has been greatly reduced, so that the inrush current can be effectively suppressed.

As shown in FIG. 5, the switched-capacitor power converting apparatus 2 of the invention does not start switching at the time T1 when the output voltage VOUT is 0, as in the conventional switched-capacitor power converting apparatus, but waits until the time T2 when the output voltage VOUT is adjusted to a default value (e.g., one-half of the input voltage VIN) T2 and starts to switch. At this time, since the voltage difference between the input voltage VIN and the output voltage VOUT has been greatly reduced, when the first switch SW1 closest to the input voltage VIN in the output stage 20 is turned on at the time T2, the input current IIN flowing through the first switch SW1 is equivalent to the switching current in the operation mode, and there is no "inrush current" phenomenon that occurs in the conventional technology. Therefore, the stability of the switched-capacitor power converting apparatus 2 during power conversion can be effectively improved.

Figure 6:
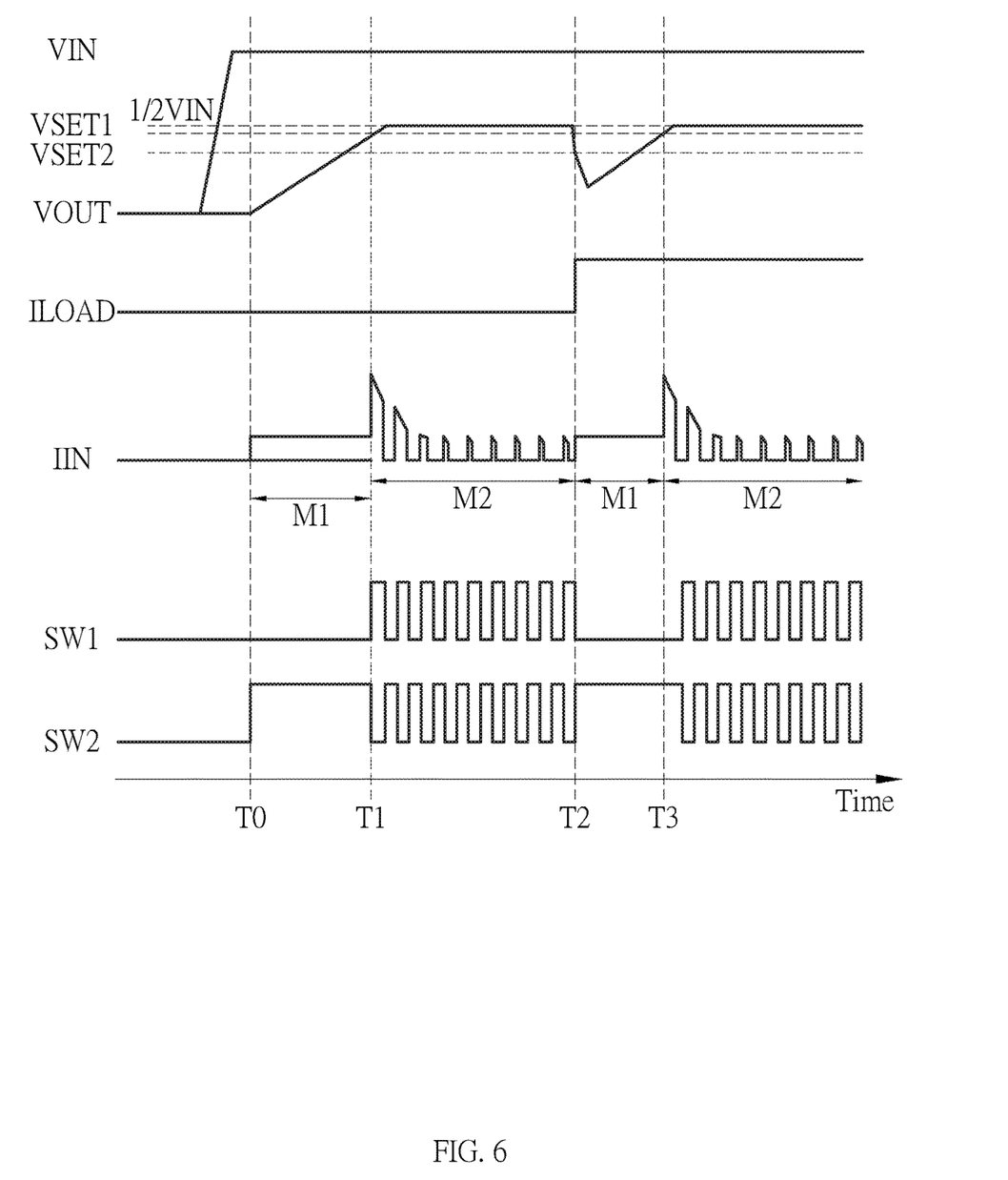
FIG. 6 illustrates timing diagrams of the waveforms of the signals in the switched-capacitor power converting apparatus of FIG. 4.

Please refer to FIG. 6. FIG. 6 illustrates timing diagrams of the waveforms of the signals in the switched-capacitor power converting apparatus of FIG. 4. It should be noted that the input current IIN is the current flowing through the first switch SW1 and the load current ILOAD is the current generated at the output terminal OUT when the system is coupled to a load; the first voltage value VSET1 is higher than the second voltage value VSET2 and the default value (e.g., one-half of the input voltage ½VIN) is higher than the first voltage value VSET1.

As shown in FIG. 6, at the time T0, the system starts to operate, and the output voltage VOUT is lower than the first voltage value VSET1 at this time, the determination circuit 26 will control the voltage regulation circuit 24 to maintain the output voltage VOUT at the default value (e.g., one-half of the input voltage ½ VIN), so that the system is in the default voltage mode M1. Since the input current IIN is limited to a fixed value in the default voltage mode M1, the output voltage VOUT will climb to the default value (e.g., one-half of the input voltage ½ VIN) with a fixed slope.

At the time T1, the output voltage VOUT climbs to the first voltage value VSET1. At this time, the determination circuit 26 will turn off the voltage regulation circuit 24, and the system will enter the operation mode M2. When the system has just entered the operation mode M2, because the output voltage VOUT has not reached the default value (e.g., one-half of the input voltage ½VIN), the output voltage VOUT will continue to rise, resulting in the input current IIN will be higher during the first few cycles just entering the operation mode M2.

At the time T2, the system is coupled to the load, and the output terminal OUT will generate a load current ILOAD, so that the output voltage VOUT will start to decrease. When the output voltage VOUT is lower than the second voltage value VSET2, the determination circuit 26 will switch the system to the default voltage mode M1. Since the input current IIN is limited to the fixed value in the default voltage mode M1, the output voltage VOUT will climb to the default value (e.g., one-half of the input voltage ½VIN) with a fixed slope.

At the time T3, the output voltage VOUT climbs to the first voltage value VSET1. At this time, the determination circuit 26 will turn off the voltage regulation circuit 24, and the system will enter the operation mode M2. When the system has just entered the operation mode M2, since the output voltage VOUT has not reached the default value (e.g., one-half of the input voltage ½VIN), the output voltage VOUT will continue to rise, resulting in the input current TIN will be higher during the first few cycles just entering the operation mode M2.

Another embodiment of the invention is a switched-capacitor power converting apparatus operating method. In this embodiment, the switched-capacitor power converting apparatus operating method is used to operate a switched-capacitor power converting apparatus. The switched-capacitor power converting apparatus includes an output stage. The output stage includes a first switch, a second switch, a third switch and a fourth switch. The first switch, the second switch, the third switch and the fourth switch are coupled in series between an input voltage and a ground terminal. The output stage has an output terminal, and the output terminal is located between the second switch and the third switch.

Figure 7:
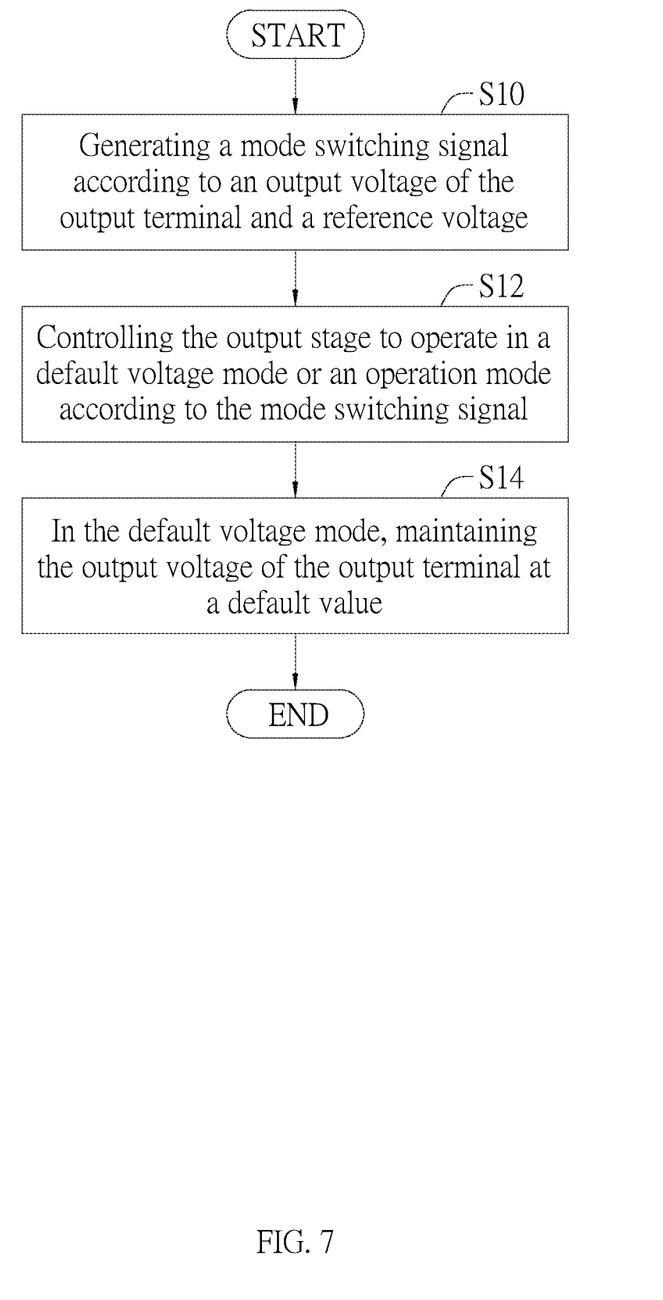
FIG. 7 illustrates a flowchart of the switched-capacitor power converting apparatus operating method in another embodiment of the invention.

Please refer to FIG. 7. FIG. 7 is a flowchart illustrating the switched-capacitor power converting apparatus operating method in this embodiment. As shown in FIG. 7, the switched-capacitor power converting apparatus operating method includes the following steps:

Step S10: generating a mode switching signal according to an output voltage of the output terminal and a reference voltage;

Step S12: controlling the output stage to operate in a default voltage mode or an operation mode according to the mode switching signal; and Step S14: in the default voltage mode, maintaining the output voltage of the output terminal at a default value.

In practical applications, the reference voltage is a first voltage value in the default voltage mode and is a second voltage value in the operation mode, wherein the first voltage value is greater than the second voltage value. In the operation mode, when the output voltage of the output terminal is lower than the second voltage value, the method will switch the output stage from the operation mode to the default voltage mode.

Compared to the prior arts, the switched-capacitor power converting apparatus and an operating method thereof in the invention selectively switch the output stage to operate in a default voltage mode or an operation mode according to an output voltage and a reference voltage. In the default voltage mode, the output voltage is maintained at a default value; in the operation mode, when the output voltage is lower than the default voltage, the operation mode is switched back to the default voltage mode.

Therefore, when the switched-capacitor power converting apparatus of the invention performs switching, since the voltage difference between the output voltage and the input voltage has been greatly reduced, that is to say, the voltage across both sides of the first switch closest to the input voltage in the output stage has been greatly reduced, so that the inrush current flowing through the first switch when the first switch is turned on can be effectively suppressed to improve the stability of the switched-capacitor power converting apparatus for power conversion.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A switched-capacitor power converting apparatus, comprising:
   an output stage having an output terminal;
   a determination circuit, coupled to the output terminal, configured to generate a mode switching signal according to an output voltage of the output terminal and a reference voltage;
   a switch control circuit, coupled to the output stage and the determination circuit, configured to control the output stage to operate in a default voltage mode or an operation mode according to the mode switching signal; and
   a voltage regulation circuit, coupled to the output terminal and coupled to a node between the determination circuit and the switch control circuit, configured to receive the mode switching signal and generate a control signal to control an operation of a transistor coupled between an input voltage and the output voltage to maintain the output voltage of the output terminal at a default value in the default voltage mode.

2. The switched-capacitor power converting apparatus of claim 1, wherein the reference voltage is a first voltage value in the default voltage mode and the reference voltage is a second voltage value in the operation mode; the first voltage value is greater than the second voltage value.

3. The switched-capacitor power converting apparatus of claim 2, wherein in the operation mode, when the output voltage of the output terminal is lower than the second voltage value, the output stage is switched from the operation mode to the default voltage mode.

4. The switched-capacitor power converting apparatus of claim 1, wherein the determination circuit comprises:
   a first transistor, one terminal of the first transistor is coupled to the first voltage value and a gate of the first transistor is controlled by the mode switching signal;
   a second transistor, one terminal of the second transistor is coupled to the second voltage value and a gate of the second transistor is controlled by a switch control signal, wherein the switch control signal and the mode switching signal are opposite to each other; and
   a comparator, one input terminal of the comparator is coupled to the output terminal and the other input terminal of the comparator is coupled to the other terminal of the first transistor and the other terminal of the second transistor, the comparator is configured to receive the output voltage and the reference voltage respectively and generate the mode switching signal accordingly.

5. The switched-capacitor power converting apparatus of claim 1, wherein the switch control circuit comprises:

an inverter, coupled to the determination circuit, configured to generate a switch control signal according to the mode switching signal, wherein the switch control signal and the mode switching signal are opposite to each other; and a control circuit, coupled to the inverter and the output stage, configured to control an operation of the output stage according to the switch control signal.

6. The switched-capacitor power converting apparatus of claim 1, wherein the voltage regulation circuit comprises:

a first resistor and a second resistor coupled in series between the input voltage and a ground terminal;

the transistor, a third resistor and a fourth resistor coupled in series between the input voltage and the ground terminal; and an error amplifier, one input terminal of the error amplifier is coupled between the first resistor and the second resistor to receive a voltage signal and the other input terminal of the error amplifier is coupled between the third resistor and the fourth resistor to receive a feedback signal, the error amplifier is configured to generate the control signal according to the mode switching signal, the voltage signal and the feedback signal.

7. A method of operating a switched-capacitor power converting apparatus, the switched-capacitor power converting apparatus comprising an output stage having an output terminal, the method comprising steps of:

(a) generating a mode switching signal according to an output voltage of the output terminal and a reference voltage;

(b) controlling the output stage to operate in a default voltage mode or an operation mode according to the mode switching signal; and (c) in the default voltage mode, receiving the mode switching signal and generating a control signal to control an operation of a transistor coupled between an input voltage and the output voltage to maintain the output voltage of the output terminal at a default value.

8. The method of claim 7, wherein the reference voltage is a first voltage value in the default voltage mode and the reference voltage is a second voltage value in the operation mode; the first voltage value is greater than the second voltage value.

9. The method of claim 7, further comprising a step of:

(d) in the operation mode, when the output voltage of the output terminal is lower than the second voltage value, switching the output stage from the operation mode to the default voltage mode.

* * * * *